June 16, 1925.
G. A. TAYLOR
1,542,423
MEANS FOR PREVENTING LEAKAGE PAST THE PISTONS OF INTERNAL COMBUSTION ENGINES
Filed Feb. 10, 1921
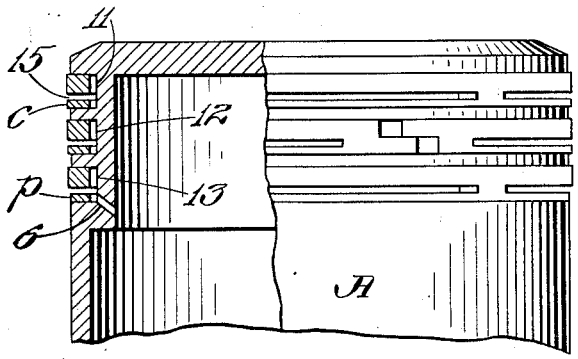
Fig.1.
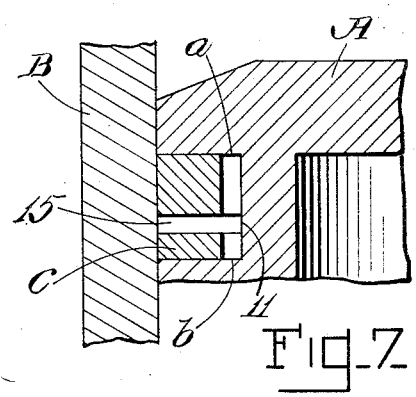
Fig.7.
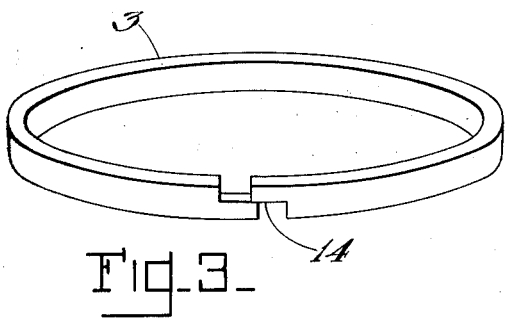
Fig.3.
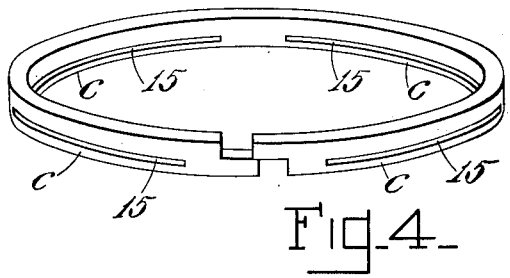
Fig.4.
Fig.2.
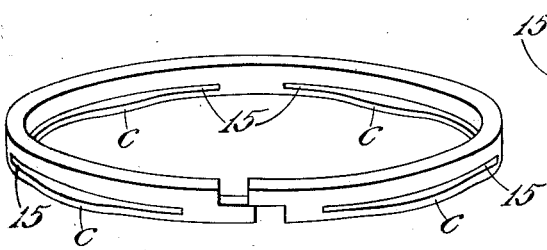
Fig.5.
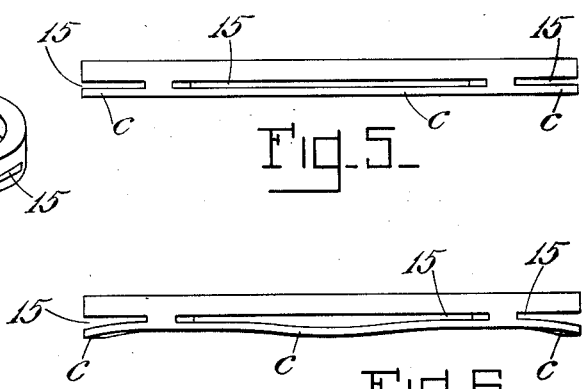
Fig.6.
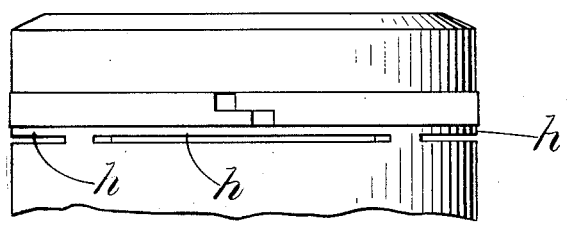
Fig.8.
INVENTOR:
George A. Taylor
by Macleod, Calver, Copeland &c.
Attys.

Patented June 16, 1925.

1,542,423

UNITED STATES PATENT OFFICE.

GEORGE A. TAYLOR, OF BOSTON, MASSACHUSETTS.

MEANS FOR PREVENTING LEAKAGE PAST THE PISTONS OF INTERNAL-COMBUSTION ENGINES.

Application filed February 10, 1921. Serial No. 444,055.

*To all whom it may concern:*

Be it known that I, GEORGE A. TAYLOR, a citizen of the United States, residing at Boston, county of Suffolk, State of Massachusetts, have invented a certain new and useful Improvement in Means for Preventing Leakage Past the Pistons of Internal-Combustion Engines, of which the following is a specification, reference being had therein to the accompanying drawings.

My present invention relates to an improvement in means for preventing leakage past the piston from the combustion chamber to the crank case of an internal combustion engine, this means being preferably embodied in a piston ring. The particular object of the present invention is to provide in combination with a piston a piston ring which will remain tight under all conditions of use for a longer time than piston rings now in use, and which will not break when in use and damage the walls of the cylinder. My invention in its broadest aspects comprises the combination of piston and piston ring, one or the other of these parts having the peculiar construction described herein. While the combination will ordinarily include a piston of ordinary construction and a piston ring of the novel construction described herein, the invention may also be practiced by employing a piston ring of ordinary construction in combination with a novel piston as will be explained.

The piston ring embodying my invention in its preferred form presents to the cylinder wall a surface substantially like that of the ordinary one-piece piston ring and, therefore, has all the advantages of this type. In addition thereto means are provided by which the ring is held strongly with its upper edge in contact with the top surface of the groove in the piston. This is a very important feature, as I have found by actual practice that if the piston ring is held strongly against the top surface of the groove no difficulty from leakage will be experienced. Furthermore, the pressure exerted by the ring on the top and bottom walls of the groove prevents the piston ring from turning on the piston. This is important because if the piston ring turns after having been once run in, it will not fit tight in the new position.

My improved piston ring has the great advantage that it comprises a single member instead of two or three members. Furthermore, it does not include any separate spring or tempered members which in the past have been one of the chief objections to so-called pressure or leak-proof piston rings, because these slender tempered members have frequently broken into small pieces which become displaced and score the interior walls of the cylinders. The ring or piston embodying my invention as ordinarily constructed produces a greater friction between the contacting surfaces of the piston ring and piston groove and therefore the ring exerts less radial pressure on the walls of the cylinder, thereby reducing the tendency of the ring to wear the cylinder wall which is a chief cause of pistons becoming loose.

The invention will be fully understood from the following description when taken in connection with the accompanying drawings, and the novel features thereof will be pointed out and clearly defined in the claims at the close of this specification.

In the drawings, Fig. 1 is a view of a piston and piston rings embodying my invention in its preferred form.

Fig. 2 is a view in perspective of a piston ring shown in Figure 1.

Fig. 3 is a view in perspective showing a piston ring before the slots are cut.

Fig. 4 is a similar view showing the ring after the slots are cut.

Fig. 5 is an edge view or side elevation of the ring shown in Figure 4.

Fig. 6 is a side elevation of the completed ring, as shown in Figure 2.

Fig. 7 is a section of a portion of the cylinder wall, piston and a piston ring embodying my invention.

Fig. 8 illustrates a modified form of my invention.

Referring now to the drawings, at A is shown a piston suitable for use with with the piston ring shown in Figures 2 and 6. This piston has the ordinary grooves 11, 12 and 13 in each of which is placed one of the piston rings shown in Figures 2 and 6. The top surface of the groove is designated *a*, the bottom surface *b* and the cylinder wall itself is designated B.

The piston ring embodying my invention in its preferred form will be best understood by describing the manner in which it is made. In making my improved piston ring, I take a plain one-piece piston ring 3 of ordinary construction, such as is shown in Figure 3, and which preferably has a step-cut joint, as shown at 14. I then cut a series of slots 15 parallel with the top and bottom faces and preferably nearer one face than the other. In practice, I make the slots nearer the lower face. I find that four slots each of about 80° in length produce a very satisfactory ring. These slots are preferably arranged symmetrically so that in the completed ring an even distribution of pressure will result. After the slots are cut, the portions c below the slot are deformed or bent downward, as shown in Figure 6, and this portion of the ring is heated to a temperature sufficient to set the metal, so that it will retain the deformation. This treatment converts the member c into four springs integral with the remainder of the ring, but does not distort the remainder of the ring in any way. Since the ends of the spring members c are integral with the body of the ring, and since the spring members have been permanently lengthened by the treatment described, a very strong spring action results so that when the ring is placed in a groove of a width substantially equal to the original thickness of the ring, the ring will be very strongly seated against the top surface a of the groove in the piston. This construction also practically eliminates the possibility of breakage and conseq scoring of the cylinder walls by broken parts. This is a very great advantage as the expense for regrinding cylinders when the expense of disassembling and reassembling the engine is included, is very heavy and indeed almost prohibitive.

At 6 is shown one of several oil holes leading from the bottom of the lower groove of the piston so that oil scraped from the wall of the cylinder by the piston ring will drain to the interior of the piston and so back into the crankcase. When the ring is to be used as a scraper ring in this way, it is down to a slightly smaller diameter at the bottom, as shown at p in Figure 1. This construction prevents any excess of oil reaching the top of the cylinder.

In Figure 8, I have shown my invention in a modified form. In this figure, the spring members are shown as formed by cutting grooves d in the piston itself closely adjacent the bottom surface of the piston ring groove and then deforming and setting the spring members h. A plain one-piece piston ring is then employed, being held firmly in place by the spring members. Under certain conditions of use, this construction may prove better than the first-mentioned construction, but under ordinary conditions I prefer the first.

While I have described herein a particular method of making the hereindescribed piston ring or piston, I do not limit myself to the method employed since it is obvious that there are other ways of making them. Furthermore, I do not limit myself to spring members of the particular structure or arrangement shown, since I believe myself to be the first to make a spring which acts lengthwise of the piston as a part of a piston ring or its co-operating piston, and therefore intend to claim my invention in the broadest manner permitted by law.

What I claim is:—

1. An improved piston ring which includes a series of spring members located at an end face of the ring and having their ends integral with the body of the ring, said members having portions intermediate their ends which project beyond the remainder of the face of the ring and are adapted to engage one wall of the piston ring groove and hold said ring against movement in an axial direction.

2. The improved piston ring having a slot cut adjacent one surface of said ring and the material between the slot and said surface being permanently deformed to form a spring member by which said ring will be held firmly against the walls of the groove of the piston with which it is to be used.

3. The combination with the body member of a piston formed with a circumferential groove; of a piston ring member within said groove and slit at intervals in the zone of the ring member to form two piston rings connected in one integral structure one of said rings being also a spring, the ring member being thinner than the width of the groove where the ring member is unslit and wider where slit before insertion within the groove to require compression to be received within the groove.

4. A piston ring structure comprising a thick piston ring and a thin spring piston ring spaced apart from the thick ring and united therewith at intervals, the ring structure being reduced in thickness at the places where the two rings are connected and at the ends of the arcuate portions of the thin ring that are between these places of connection between the rings.

In testimony whereof I affix my signature.

GEORGE A. TAYLOR.